US011762900B2

(12) United States Patent
Tagra et al.

(10) Patent No.: US 11,762,900 B2
(45) Date of Patent: Sep. 19, 2023

(54) CUSTOMIZED SELECTION OF VIDEO THUMBNAILS TO PRESENT ON SOCIAL MEDIA WEBPAGES

(71) Applicant: ADOBE INC., San Jose, CA (US)

(72) Inventors: Sanjeev Tagra, Haryana (IN); Sachin Soni, New Delhi (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/668,185

(22) Filed: Feb. 9, 2022

(65) Prior Publication Data

US 2022/0164382 A1    May 26, 2022

Related U.S. Application Data

(63) Continuation of application No. 16/579,157, filed on Sep. 23, 2019, now Pat. No. 11,281,717.

(51) Int. Cl.
*G06F 16/55* (2019.01)
*G06F 16/56* (2019.01)
*G06F 16/74* (2019.01)
*G06F 18/23213* (2023.01)
*G06V 10/762* (2022.01)
*G06V 20/30* (2022.01)
*G06V 40/10* (2022.01)
*G06V 40/16* (2022.01)

(52) U.S. Cl.
CPC .............. *G06F 16/56* (2019.01); *G06F 16/55* (2019.01); *G06F 16/743* (2019.01); *G06F 18/23213* (2023.01); *G06V 10/763* (2022.01); *G06V 20/30* (2022.01); *G06V 40/10* (2022.01); *G06V 40/174* (2022.01)

(58) Field of Classification Search
CPC ........ G06F 16/743; G06F 16/56; G06F 16/50; G06F 16/70; G06F 16/80; G06F 16/90; G06F 16/55; G06K 9/6223; G06K 9/46; G06V 10/40; G06V 10/763; G06V 40/10; G06V 40/174; G06V 20/30
See application file for complete search history.

(56) References Cited

U.S. PATENT DOCUMENTS

2013/0101220 A1    4/2013    Bosworth et al.
2019/0205402 A1    7/2019    Semau et al.

*Primary Examiner* — Sanchita Roy
(74) *Attorney, Agent, or Firm* — SHOOK, HARDY & BACON LLP

(57) ABSTRACT

A framework generates a thumbnail to represent a video on a webpage based on a prominent individual appearing in both the video and content of the webpage. Content of a webpage on which a video is to be posted is analyzed to identify individuals represented in the webpage content. Frames of the video are also analyzed to identify individuals in the video. A first individual that appears in both the webpage content and the video is selected based on a score for the first individual determined based on the webpage content. Subsequent to selecting the first individual, frames of the video that include the first individual are analyzed to select a first frame of the video that includes the first individual. A thumbnail to represent the video on the webpage is generated from the first frame, and the thumbnail is provided for presentation on the webpage to represent the video.

20 Claims, 8 Drawing Sheets

CUSTOMIZED SELECTION OF VIDEO THUMBNAILS TO PRESENT ON SOCIAL MEDIA WEBPAGES

CROSS-REFERENCE TO RELATED APPLICATIONS

This patent application is a continuation of U.S. patent application Ser. No. 16/579,157, filed Sep. 23, 2019, which is hereby incorporated herein by reference in its entirety.

BACKGROUND

Brands expend a lot of resources on marketing and engage in a multitude of different marketing verticals to promote their products, content and brand. One such marketing vertical is "Influencer Marketing" in which brands partner with social media influencers/celebrities and leverage the bond between such influencers/celebrities and their audiences to promote and sell their content and/or products. Influencer Marketing has been proven to provide brands a strong return-on-investment over time. The psychology behind Influencer Marketing is simple: People feel connected with and trust certain influencers/celebrities and tend to believe in whatever they say and do. This psychology has proven to play out regardless of whether or not an influencer/celebrity is promoting something intentionally. By way of example, people often emulate the hairstyle of their favorite influencer/celebrity even when s/he is not promoting the style. Similarly, people often follow and engage in the dress and/or makeup styles of their favorite influencer/celebrity even when the dress and/or makeup style is irrelevant to that for which the influencer/celebrity is known.

These examples illustrate that people often form an emotional connection with those influencers/celebrities that they like and/or can relate to. This emotional connection also can influence a person's behavior with regard to online content consumption. That is, when a person sees content, a post, a video, or the like of someone that they follow, admire and/or relate to, they tend to select the post/video/etc. and engage with the associated content. For instance, a person with an affinity for watching and/or participating in cricket is likely to select a video thumbnail showing Yuvraj Singh (a famous cricket player in India) even if that person has seen the video that the thumbnail represents numerous times before.

While various modalities permit custom selection of a thumbnail to be presented as representative of a to-be-posted video, generally speaking, the thumbnail representing the to-be-posted video is static. That is, a single thumbnail representing a video is selected for presentation on all social media webpages on which the video is to be posted. In this way, sharing and re-sharing of the video among a multitude of social media webpages, each having a different set of users, results in presentation of the same video thumbnail as representative of the video on each webpage. As different sets of users may follow, admire and/or relate to different influencers/celebrities, and a given video often includes more than one influencer/celebrity in the content thereof, a static video thumbnail may encourage maximum engagement with the set of users of a first social media webpage and yet fail to encourage engagement with the set of users of a second social media webpage. Additionally, various sets of users that follow, admire and/or relate to the same influencer/celebrity may tend to respond to different characteristics of the influencer/celebrity. Thus, again, a static video thumbnail may encourage maximum engagement with the set of users of one social media webpage and yet fail to encourage engagement with the set of users of another social media webpage.

SUMMARY

Embodiments of the present disclosure relate to, among other things, generating a thumbnail to represent a video on a webpage based on a prominent individual appearing in both the video and content of the webpage. For instance, embodiments may be employed to provide automatic generation of a thumbnail from a frame of a video based on the frame including an image of an individual exhibiting a certain characteristic (e.g., a facial expression, a body posture, a particular style of dress, or the like). This may be a characteristic to which users that interact with the webpage tend to respond.

To generate a thumbnail, content of a webpage on which a video is to be posted is analyzed to identify individuals represented in the webpage content. Frames of the video are also analyzed to identify individuals in the video. A first individual that appears in both the webpage content and the video is selected based on a score for the first individual determined based on the webpage content. Subsequent to selecting the first individual, frames of the video that include the first individual are analyzed to select a first frame of the video that includes the first individual. A thumbnail to represent the video on the webpage is generated from the first frame, and the thumbnail is provided for presentation on the webpage to represent the video.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
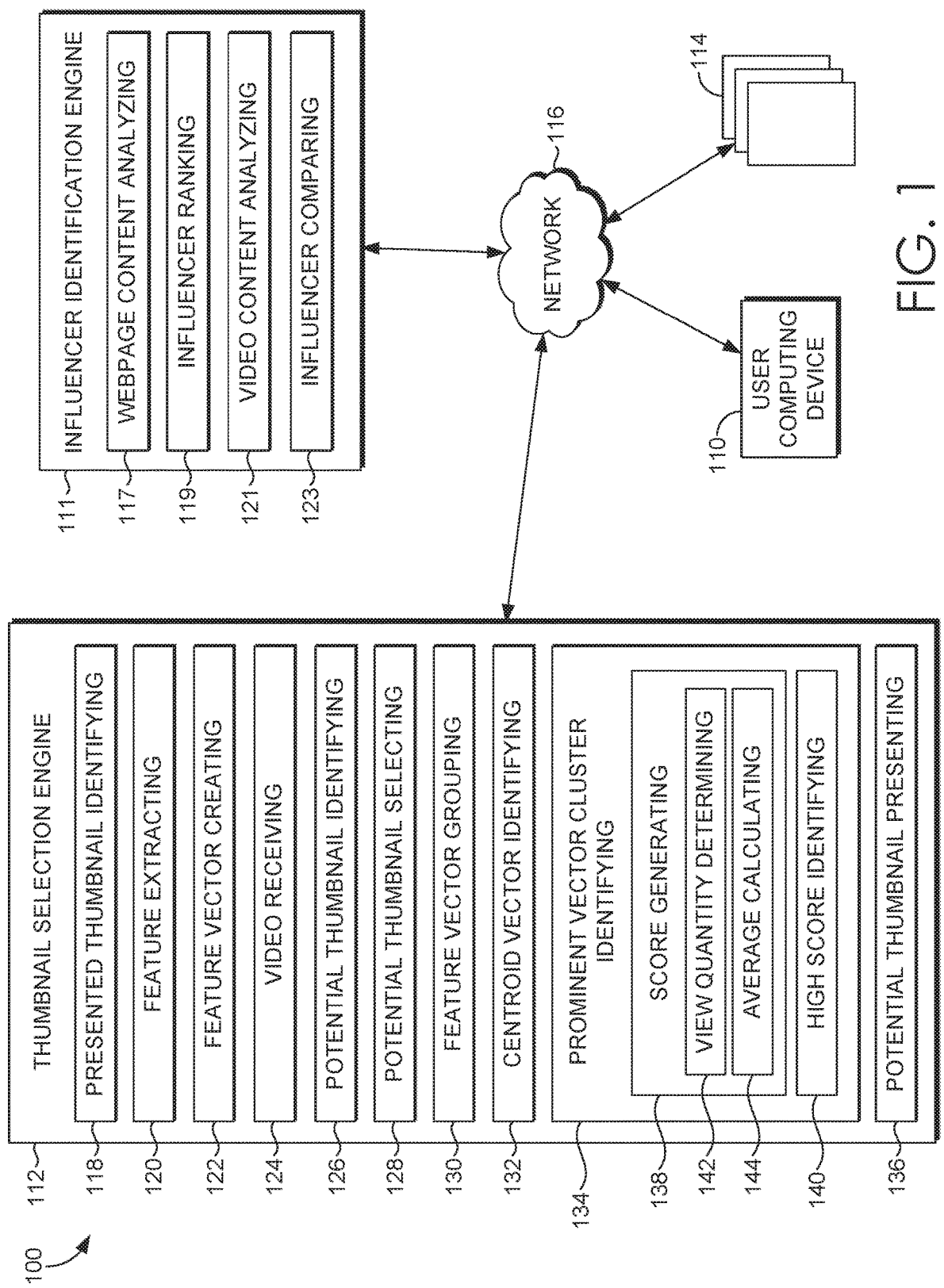
FIG. 1 is a block diagram illustrating an exemplary system for selecting thumbnails for presentation on social media webpages, each thumbnail being representative of a video to be posted on one or more of the social media webpages, in accordance with implementations of the present disclosure.

The subject matter of the present disclosure is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Brands engage in a variety of marketing modalities to promote their products, services, content, etc. One such marketing modality generally is referred to as "Influencer Marketing." In Influencer Marketing, brands partner with social media influencers/celebrities and leverage the bond between such influencers/celebrities and their audiences to promote and sell their products, services, and/or content. As used herein, the term "social media influencer(s)" refers to a person or persons having an audience or following with an exhibited deep-seated loyalty to them. Further, the terms "influencer" and "celebrity" are used interchangeably herein.

Influencer Marketing has been proven to provide brands a strong return on their marketing investment over time. The psychology behind Influencer Marketing has proven to play out regardless of whether or not an influencer/celebrity is intentionally promoting a product, service, or content. For instance, people often emulate the hairstyle of their favorite influencer even when s/he is not promoting the style. Similarly, people often follow and engage in the dress and/or makeup styles of their favorite influencer even when the dress and/or makeup style is irrelevant to that for which the influencer is known.

These examples illustrate that people often form an emotional connection with those influencers that they like, admire and/or relate to. This emotional connection also can influence a person's behavior with regard to online content consumption. That is, when a person sees content, a post, a video, or the like of someone that they follow, admire and/or relate to, they tend to select the post/video/etc. and engage with (e.g., view) the associated content. Thus, selection of the thumbnail that is representative of a post, a video, or other content can play a significant role in whether the content represented by the thumbnail is engaged with or not.

With particular reference to video content, there are various modalities that permit custom selection of a thumbnail to be presented as representative of a to-be-posted video. Generally speaking, however, the thumbnail representing a to-be-posted video is static. That is, a single thumbnail representing a video is selected for presentation on all social media webpages on which the video is to be posted. In this way, sharing and re-sharing of the video among a multitude of social media webpages, each having a different set of users, results in presentation of the same video thumbnail as representative of the video on each webpage. As different sets of users may follow, admire and/or relate to different influencers, and a given video often includes more than one influencer in the content thereof, a static video thumbnail may encourage maximum engagement with the set of users of a first social media webpage and yet fail to encourage engagement with the set of users of a second social media webpage. Additionally, various sets of users that follow, admire and/or relate to the same influencer may tend to respond to different characteristics of the influencer. Thus, again, a static video thumbnail may encourage maximum engagement with the set of users of one social media webpage and yet fail to encourage engagement with the set of users of another social media webpage.

Embodiments of the present disclosure address the challenges related to static video thumbnail presentation by providing a framework for customizing selection of a thumbnail for presentation on a social media webpage. The selected thumbnail is representative of a video to be posted on the webpage and includes an image of an influencer identified as a prominent influencer with regard to users that interact with the webpage. In various aspects, the selected thumbnail includes the prominent influencer exhibiting a particular characteristic (e.g., a facial expression, a body posture, a particular style of dress, or the like) to which the users that interact with the webpage tend to respond. Appropriate selection of a video thumbnail that is likely to be highly influential to users of a particular social media webpage has the potential to maximize user engagement with the thumbnail (i.e., maximize selection of the video thumbnail such that a large quantity of users view the associated video).

Content of a social media webpage on which a video is to be posted is analyzed to identify one or more prominent influencer(s) represented in the webpage content. More particularly, content of a social media webpage on which a video is to be posted is analyzed to identify one or more influencer(s) represented in the webpage content. The identified influencer(s) are ranked based upon prominence (e.g., representation frequency) such that one or more influencer(s) having increased prominence as compared to other influencer(s) represented in the webpage content receive a high ranking and one or more influencer(s) having decreased relative prominence receive a low ranking.

The identified prominent influencer(s) represented in the webpage content are correlated with influencer(s) represented in the to-be-posted video content. More particularly, content of the video to be posted is analyzed to identify one or more influencer(s) represented in the content of the to-be-posted video. The influencer(s) represented in the to-be-posted video are compared with a ranked listing of influencer(s) represented in the webpage content and the one or more highest ranked influencer(s) represented in the webpage content that are also represented in the content of the to-be-posted video are identified as the most prominent influencer(s) on the webpage for purposes of selecting a thumbnail to represent the to-be-posted video on the webpage.

Once the most prominent influencer(s) are determined, the one or more most influential thumbnails representing the video to be posted on the social media webpage are determined using thumbnails of videos already posted on the webpage and the corresponding influence the already-posted thumbnails have generated and/or are generating. More particularly, a presented thumbnail associated with each of a plurality of videos already posted on the social media webpage is identified. Each identified presented thumbnail includes an image of the most prominent influencer(s) exhibiting a first characteristic (e.g., facial expression, body posture, style of dress, etc.). A feature vector is created for each identified presented thumbnail. Also identified is a plurality of potential thumbnails, each representative of a common video yet to be posted on the social media webpage and including an image of the identified most prominent influencer(s) exhibiting a second characteristic. In various aspects, the first characteristic and the second characteristic may be the same characteristic, similar characteristics, or different characteristics. The feature vectors for the identified presented thumbnails and the feature vectors for the identified potential thumbnails are grouped into a plurality of vector clusters, for instance, utilizing the K-Means clustering algorithm. A centroid vector is identified for each vector cluster of the plurality of clusters (e.g., utilizing the K-Means clustering algorithm) and a most prominent vector cluster of the plurality of vector clusters is identified. One of the potential thumbnails is selected as representative of the common video for presentation on the social media webpage. The feature vector for the selected potential thumbnail has the most in common with the feature vectors of the most prominent vector cluster as evidenced by a distance of the feature vector for the selected potential thumbnail from the centroid vector of the most prominent vector cluster being less than a distance from the centroid vector of all other potential thumbnail feature vectors grouped in the most prominent vector cluster.

Utilizing the framework described in the present disclosure, various social media webpages on which the same video is posted can encourage engagement with the video via presentation of different thumbnails showing images/pictures of one or more influencer(s) exhibiting different characteristics, selection of the influencer(s) and the characteristic of the influencer(s) shown in the thumbnail presented on each social media webpage being based upon which influencer(s) and influencer characteristic(s) present in the video tend to garner the greatest engagement from the users of the webpage.

With reference now to FIG. 1, a block diagram is shown illustrating an exemplary system 100 for identifying one or more influencer(s) that are most prominent in association with various social media webpages and customizing the selection of video thumbnails to present in association with the various social media webpages, in accordance with embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user computing device 110, an influencer identification engine 111, a thumbnail selection engine 112, and a plurality of social media webpages 114. Each of these components can be provided via one or more computing devices, such as the computing device 900 of FIG. 9, discussed below. As shown in FIG. 1, the user computing device 110, the influencer identification engine 111, the thumbnail selection engine 112, and the plurality of social media webpages 114 may be accessed and/or can communicate with one another via a network 116, which may include, without limitation, one or more local area networks (LANs) and/or wide area networks (WANs). Such networking environments are commonplace in offices, enterprise-wide computer networks, intranets, and the Internet. It should be understood that any number of user devices, influencer identification engines and thumbnail selection engines may be employed within the system 100 within the scope of the present disclosure. Each may comprise a single device or multiple devices cooperating in a distributed environment. For instance, the thumbnail selection engine 112 could be provided by multiple server devices collectively providing the functionality of the thumbnail selection engine 112 as described herein. Additionally, other components not shown also may be included within the network environment.

The influencer identification engine 111 generally is configured to provide a framework for identifying one or more influencer(s) in the content of a social media webpage as most prominent. The user device 110 can access and communicate with the influencer identification engine 111 via a web browser or other application running on the user device 110. Alternatively, the influencer identification engine 111 may be installed on the user device 110 such that access via the network 116 is not required.

The influencer identification engine 111 includes a social media webpage content analyzing component 117, an influencer ranking component 119, a to-be-posted video content analyzing component 121, and an influencer comparing component 123. The social media webpage content analyzing component 117 is configured to analyze the content of a social media webpage on which a video is to be posted to identify one or more influencers represented in the webpage content. In various aspects, such analysis includes extracting the public data of the social media webpage utilizing social-media-platform-specific APIs. The content of the social media webpage may be parsed and influencer information extracted therefrom, for instance, utilizing celebrity recognition APIs provided by AMAZON.

The influencer ranking component 119 is configured to rank the identified influencers based upon prominence (e.g., representation frequency) such that an influencer having increased prominence as compared to other influencers represented in the webpage content receives a high ranking and an influencer having a relatively decreased prominence receives a low ranking. In various aspects, the influencer ranking component 119 generates a list of influencers identified by the social media webpage content analyzing component 117 along with a score calculated based upon the number of occurrences of each particular influencer and the engagement (e.g., likes, comments, shares, etc.) that a post containing a video of a particular influencer has previously generated. For instance, the influencer ranking component 119 may generate an influencer-to-influence map for a particular social media webpage. Initially the map would be empty and would be populated as each post is analyzed. For every post 'P' on the social media webpage, an influence score for the post may be created based on the influence that post P has previously generated (e.g., likes, comments, shares, etc.).

$$\text{Influence\_Score\_}P = W1 * \text{Num\_Likes} + W2 * \text{Num\_Comments} + W3 * \text{Num\_Shares},$$

where W1, W2 and W3 are customizable weights. Exemplary default values may be: W1=1, W2=2 and W3=3. For every identified influencer in a given post, if the influencer is not already present in the influencer-to-influence map, the influencer may be added with the corresponding influence score of Influence_Score_P. If the influencer is already present in the influencer-to-influence map, the score for that influencer may be incremented by Influence_Score_P.

The to-be-posted video content analyzing component 121 is configured to analyze the content of the to-be-posted video to identify one or more influencers represented in the content thereof. In various aspects, the to-be-posted content analyzing component 121 analyzes each video frame of the to-be-posted video to extract influencer information therefrom, for instance, utilizing celebrity recognition APIs provided by AMAZON. The to-be-posted content analyzing component 121 further may tag each analyzed video frame that includes an image of an influencer (as determined from the extracted influencer information) with an identity of the represented influencer, for instance, in metadata thereof.

The influencer comparing component 123 is configured to compare the influencers represented in the to-be-posted video with the ranked listing of influencers represented in the webpage content. The influencer comparing component 123 further is configured to identify the highest ranked influencer(s) represented in the social media webpage content that are also represented in the content of the video to be posted as a most prominent influencer on the webpage for purposes of selecting a thumbnail to represent the to-be-posted video on the webpage.

The thumbnail selection engine 112 generally is configured to provide a framework for customizing selection of a thumbnail for presentation on a social media webpage. The user device 110 can access and communicate with the thumbnail selection engine 112 via a web browser or other application running on the user device 110. Alternatively, the thumbnail selection engine 112 may be installed on the user device 110 such that access via the network 116 is not required.

The thumbnail selection engine 112 includes a presented thumbnail identifying component 118, a feature extracting component 120, a feature vector creating component 122, a video receiving component 124, a potential thumbnail identifying component 126, a potential thumbnail selecting component 128, a feature vector grouping component 130, a centroid vector identifying component 132, a prominent vector cluster identifying component 134 and a potential thumbnail presenting component 136. The presented thumbnail identifying component 118 is configured to identify a plurality of thumbnails presented in association with videos already posted on a social media webpage. Each thumbnail of the plurality is representative of an associated video posted on the social media webpage and includes an image of an influencer. The feature extracting component 120 is configured to extract a first plurality of features from each of the plurality of video thumbnails presented on the social media webpage. In aspects, the image of the influencer included in each of the plurality of presented thumbnails shows the influencer exhibiting a particular characteristic (e.g., a facial expression, a body posture, a particular style of dress, or the like).

The feature extracting component 120 further is configured to extract a second plurality of features from each of a plurality of potential thumbnails, each thumbnail of the plurality being representative of a common video to be posted on the social media webpage and including an image of the influencer. In aspects, the image of the influencer included in each of the plurality of potential thumbnails shows the influencer exhibiting a particular characteristic (e.g., a facial expression, a body posture, a particular style of dress, or the like).

The feature vector creating component 122 is configured to create a feature vector for each of the plurality of thumbnails presented on a social media webpage. In aspects, the plurality of presented thumbnails for which feature vectors are created may be restricted by one or more of a quantity of presented thumbnails and a time period during which the associated videos were posted on the social media webpage. The feature vector creating component 122 further is configured to create a feature vector for each of the plurality of potential thumbnails that are representative of the common video to be posted on the social media webpage. In aspects, the plurality of potential thumbnails may be restricted by, for instance, a predetermined maximum quantity of potential thumbnails.

The video receiving component 124 is configured to receive the common video to be posted on the social media webpage, the common video having the plurality of potential thumbnails associated therewith. The potential thumbnail identifying component 126 is configured to identify each of the potential thumbnails that may be representative of the common video.

Figure 2:
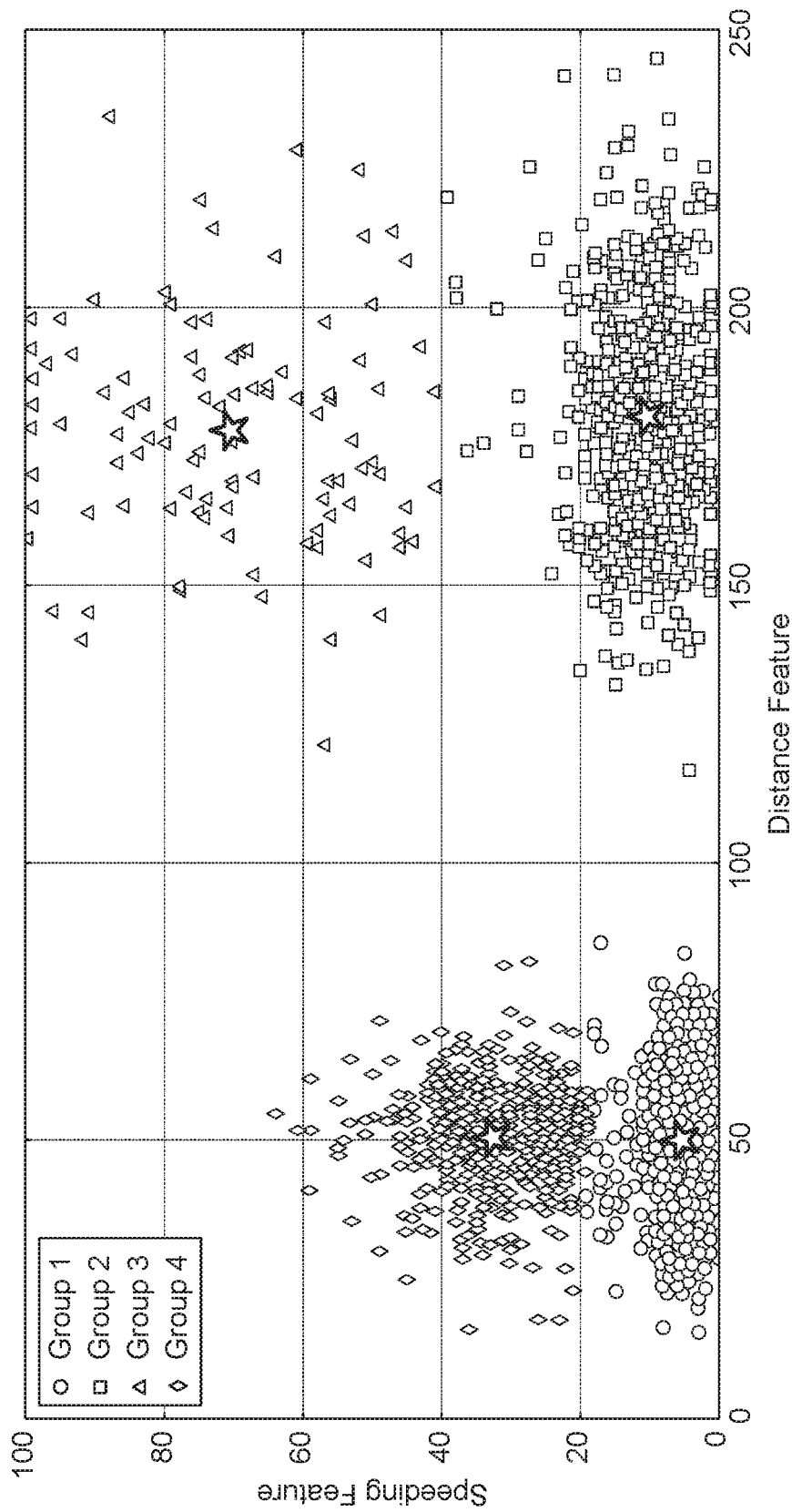
FIG. 2 is a schematic diagram illustrating a plurality of feature vectors derived from video thumbnails presented on a social media webpage and grouped into vector clusters, each cluster having a centroid vector, in accordance with implementations of the present disclosure.

The feature vector grouping component 128 is configured to group the feature vectors for the presented thumbnails and the feature vectors for the potential thumbnails into a plurality of vector clusters. The centroid vector identifying component 130 is configured to identify a centroid vector for each of the plurality of vector clusters. In some aspects, the centroid vector identifying component 130 is configured to identify the centroid vector for each of the plurality of vector clusters and the feature vector grouping component 128 is configured to group the feature vectors for the presented thumbnails and the feature vectors for the potential thumbnails into a plurality of vector clusters utilizing the K-Means clustering algorithm. Using the K-Means clustering algorithm, a feature vector is considered to be in a particular cluster if it is closer to that cluster's centroid than any other centroid. The K-Means clustering algorithm identifies centroid vectors by alternating between assigning feature vectors to clusters based upon current centroid vector and choosing centroid vectors based on a current assignment of feature vectors to clusters. The K-Means clustering algorithm is known to those having ordinary skill in the relevant art and, accordingly, it is not further described herein. FIG. 2 illustrates a schematic diagram showing a plurality of feature vectors derived from video thumbnails presented on a social media webpage and grouped into vector clusters, each cluster having a centroid vector.

The prominent vector cluster identifying component 132 is configured to identify the most prominent vector cluster of the plurality of vector clusters. The prominent vector cluster identifying component 132 includes a score generating component 138 and a high score identifying component 140. The score generating component 138 generally is configured to generate a score for each of the plurality of vector clusters. The score generating component 138 includes a view quantity determining component 142 and a view quantity average calculating component 144. The view quantity determining component 142 is configured to determine a quantity of associated video views generated by each presented thumbnail associated with the feature vectors comprising each vector cluster. The view quantity average calculating component 144 is configured to calculate an average of the determined quantities. Utilizing the calculated averages, the high score identifying component 140 is configured to identify the vector cluster having the highest score as the most prominent vector cluster.

The potential thumbnail selecting component 134 is configured to select a potential thumbnail of the plurality of potential thumbnails as representative of the common video. The feature vector for the selected potential thumbnail has a distance from the centroid vector of the most prominent vector cluster that is less than a distance from the centroid vector of all other potential thumbnail feature vectors grouped in the most prominent vector cluster.

Figure 3:
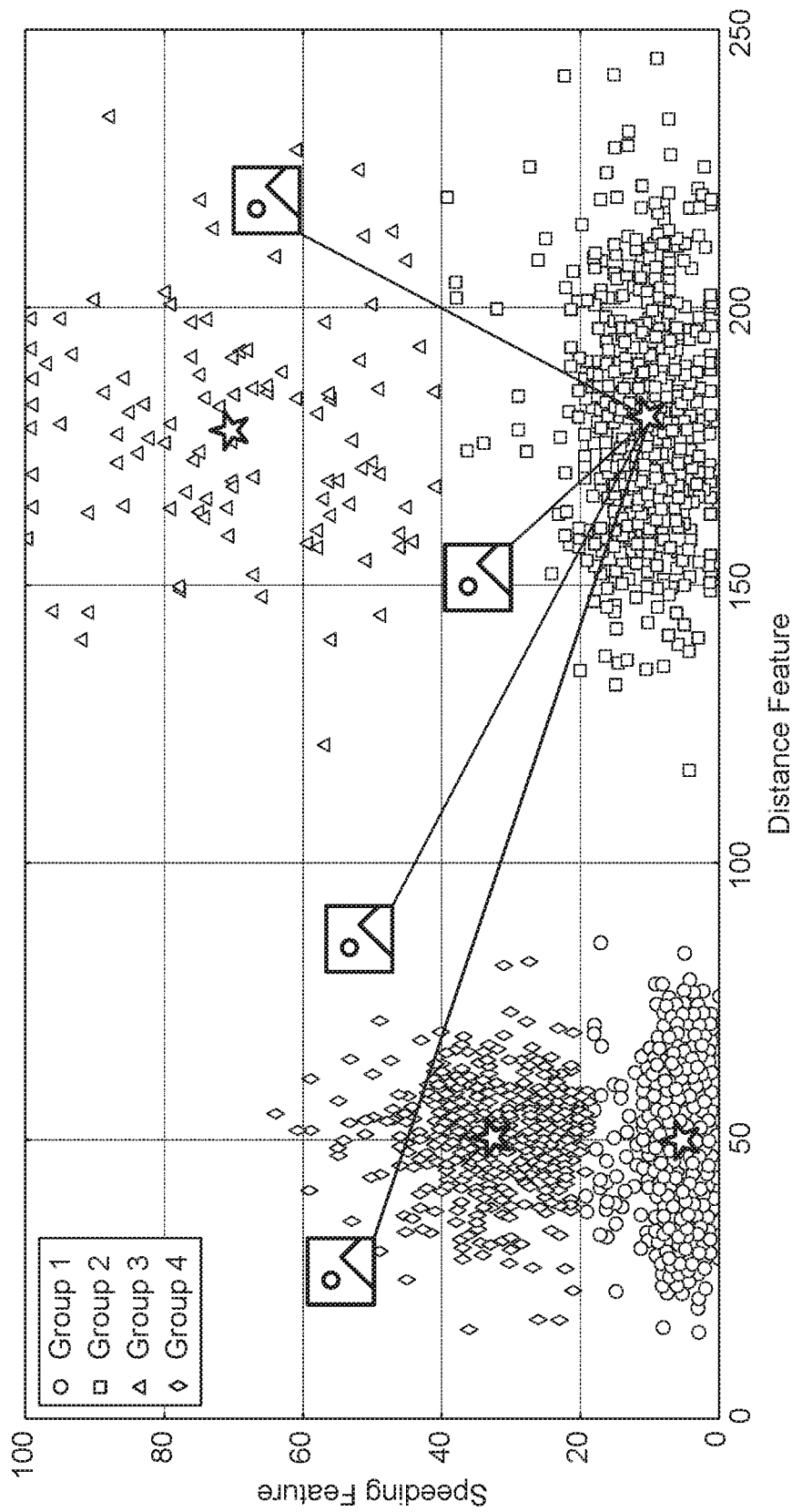
FIG. 3 is a schematic diagram illustrating the vector clusters of FIG. 2, with feature vectors for four potential thumbnails (T1, T2, T3 and T4) included in the Group 4 cluster, each potential thumbnail being representative of a common video to be posted on the social media webpage, in accordance with implementations of the present disclosure.

With reference to FIG. 3, a schematic diagram is shown illustrating the vector clusters of FIG. 2, with feature vectors for four potential thumbnails (T1, T2, T3 and T4) included in the Group 4 cluster, each potential thumbnail being representative of a common video to be posted on the social media webpage.

Returning to FIG. 1, the potential thumbnail presenting component 136 is configured to, upon the common video being posted on the social media webpage, present on the social media webpage, the selected potential thumbnail as representative of the common video.

Figure 4:
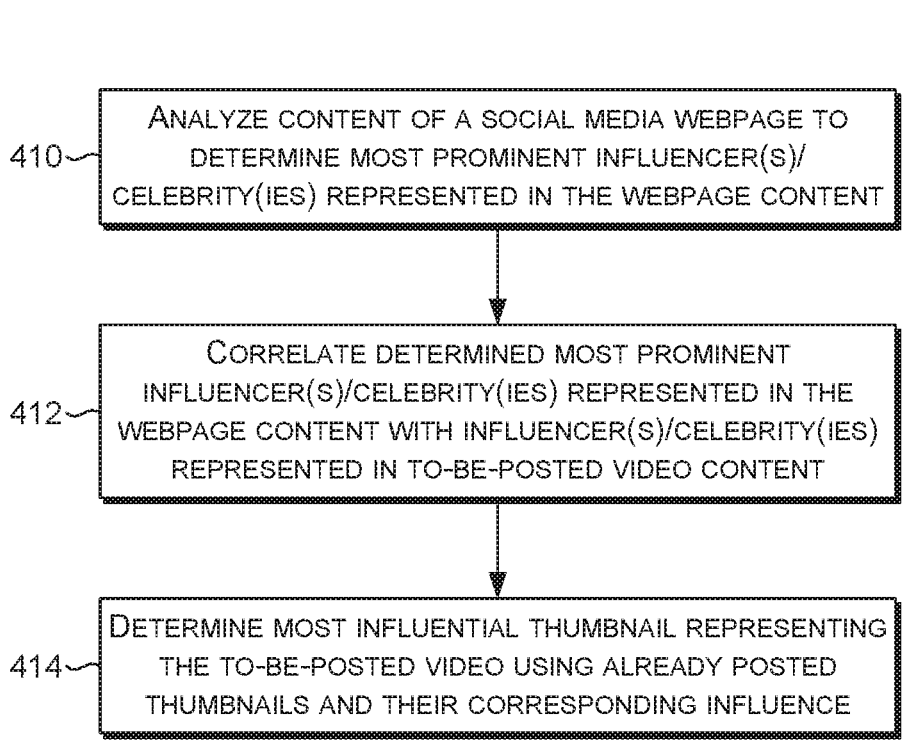
FIG. 4 is a high level flow diagram illustrating an overview of an exemplary method for customizing selection of a thumbnail for presentation on a social media webpage, the selected thumbnail being representative of a video to be posted on the webpage and including an image of one or more influencer(s)/celebrity(ies) of interest to users that interact with the webpage, the influencer(s)/celebrity(ies) exhibiting one or more characteristic(s) to which the users that interact with the webpage tend to respond, in accordance with implementations of the present disclosure.

Turning now to FIG. 4, shown is a high level flow diagram illustrating an overview of an exemplary method 400 for customizing selection of a thumbnail for presentation on a social media webpage, in accordance with implementations of the present disclosure. In aspects, the selected thumbnail is representative of a video to be posted on the webpage and includes an image of one or more influencer(s)/celebrity(ies) of interest to users that interact with the webpage, the influencer(s)/celebrity(ies) exhibiting one or more characteristic(s) to which the users that interact with the webpage tend to respond. As indicated at block 410, content of a social media webpage on which a video is to be posted is analyzed (e.g., utilizing the social media webpage content analyzing component 117 of the influencer identification engine 111 of FIG. 1) to determine one or more most prominent influencer(s)/celebrity(ies) represented in the webpage content. As indicated at block 412, the one or more most prominent influencer(s)/celebrity(ies) represented in the webpage content are correlated (e.g., utilizing the influencer comparing component 123 of the influencer identification engine 111 of FIG. 1) with influencer(s)/celebrity(ies) represented in to-be-posted video content to identify one or more influencer(s)/celebrity(ies) that are most likely to garner significant engagement from the users of the social media webpage. As indicated at block 414, once the influencer(s)/celebrity(ies) that are most likely to garner significant engagement from the users of the social media webpage on which the video is to be posted are determined, the one or more most influential thumbnails representing the video to be posted on the social media webpage are determined (e.g., utilizing the thumbnail selection engine 112 of FIG. 1) using thumbnails of videos already posted on the webpage and the corresponding influence the already-posted thumbnails have generated and/or are generating.

Figure 5:
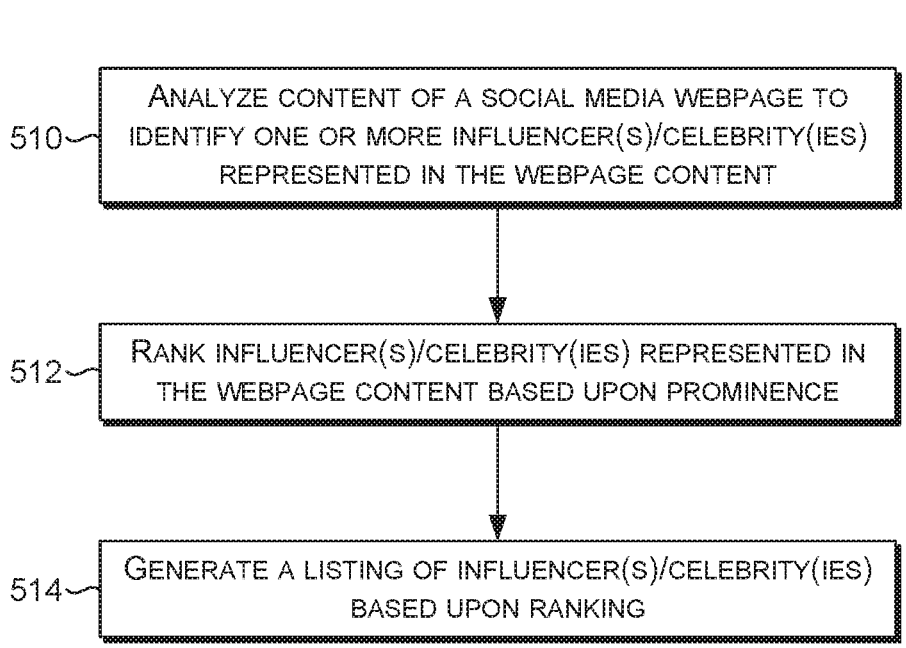
FIG. 5 is a flow diagram illustrating an exemplary method for determining one or more most prominent influencer(s)/celebrity(ies) represented in the content of a social media webpage on which a video is to be posted that is also present in the content of the to-be-posted video, in accordance with implementations of the present disclosure.

With reference to FIG. 5, shown is a flow diagram illustrating an exemplary method 500 for determining one or more most prominent influencer(s)/celebrity(ies) represented in the content of a social media webpage on which a video is to be posted that is also present in the content of the to-be-posted video, in accordance with implementations of the present disclosure. As indicated at block 510, content of a social media webpage on which a video is to be posted is analyzed (e.g., utilizing the webpage content analyzing component 117 of the influencer identification engine 111 of FIG. 1) to identify one or more influencer(s)/celebrity(ies) represented in the webpage content. As indicated at block 512, the identified influencer(s)/celebrity(ies) are ranked (e.g., utilizing the influencer ranking component 119 of the influencer identification engine 111 of FIG. 1) based upon prominence (e.g., representation frequency) such that one or more influencer(s) having increased prominence as compared to other influencer(s) represented in the webpage content receive a high ranking and one or more influencer(s) having decreased relative prominence receive a low ranking. As indicated at block 514, a listing of influencer(s)/celebrity(ies) is generated (e.g., utilizing the influencer ranking component 119 of the influencer identification engine 111 of FIG. 1) based upon the relative rankings.

Figure 6:
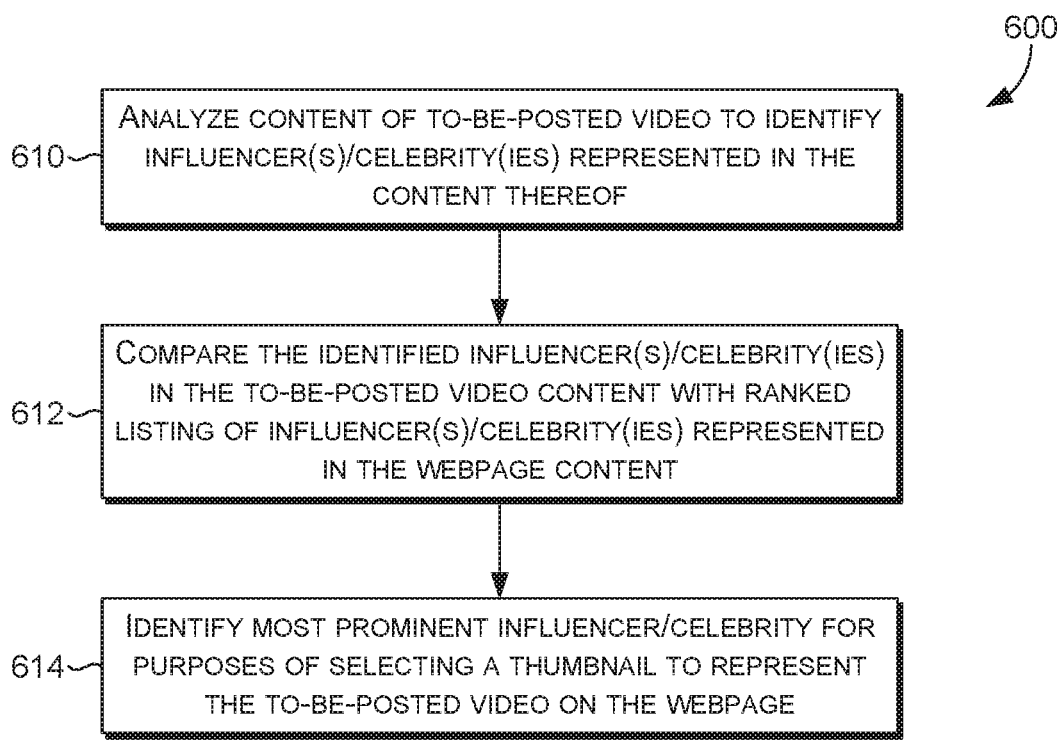
FIG. 6 is a flow diagram illustrating an exemplary method for correlating a ranked listing of influencers/celebrities represented in the content of a social media webpage with influencer(s)/celerity(ies) represented in the content of a to-be-posted video, in accordance with implementations of the present disclosure.

With reference to FIG. 6, shown is a flow diagram illustrating an exemplary method 600 for correlating a ranked listing of influencers/celebrities represented in the content of a social media webpage with influencer(s)/celebrity(ies) represented in the content of a to-be-posted video, in accordance with implementations of the present disclosure. As indicated at block 610, content of a video to be posted on a social media webpage is analyzed (e.g., utilizing the video content analyzing component 121 of the influencer identification engine 111 of FIG. 1) to identify one or more influencer(s)/celebrity(ies) represented in the content thereof. As indicated at block 612, the influencer(s)/celebrity(ies) represented in the to-be-posted video are compared (e.g., utilizing the influencer comparing component 123 of the influencer identification engine 111 of FIG. 1) with a ranked listing of influencer(s)/celebrity(ies) represented in the webpage content. As indicated at block 614, the one or more highest ranked influencer(s)/celebrity(ies) represented in the webpage content that are also represented in the content of the to-be-posted video are identified (e.g., utilizing the influencer identification engine 111 of FIG. 1) as the most prominent influencer(s)/celebrity(ies) on the webpage for purposes of selecting a thumbnail to represent the to-be-posted video on the webpage.

Figure 7:
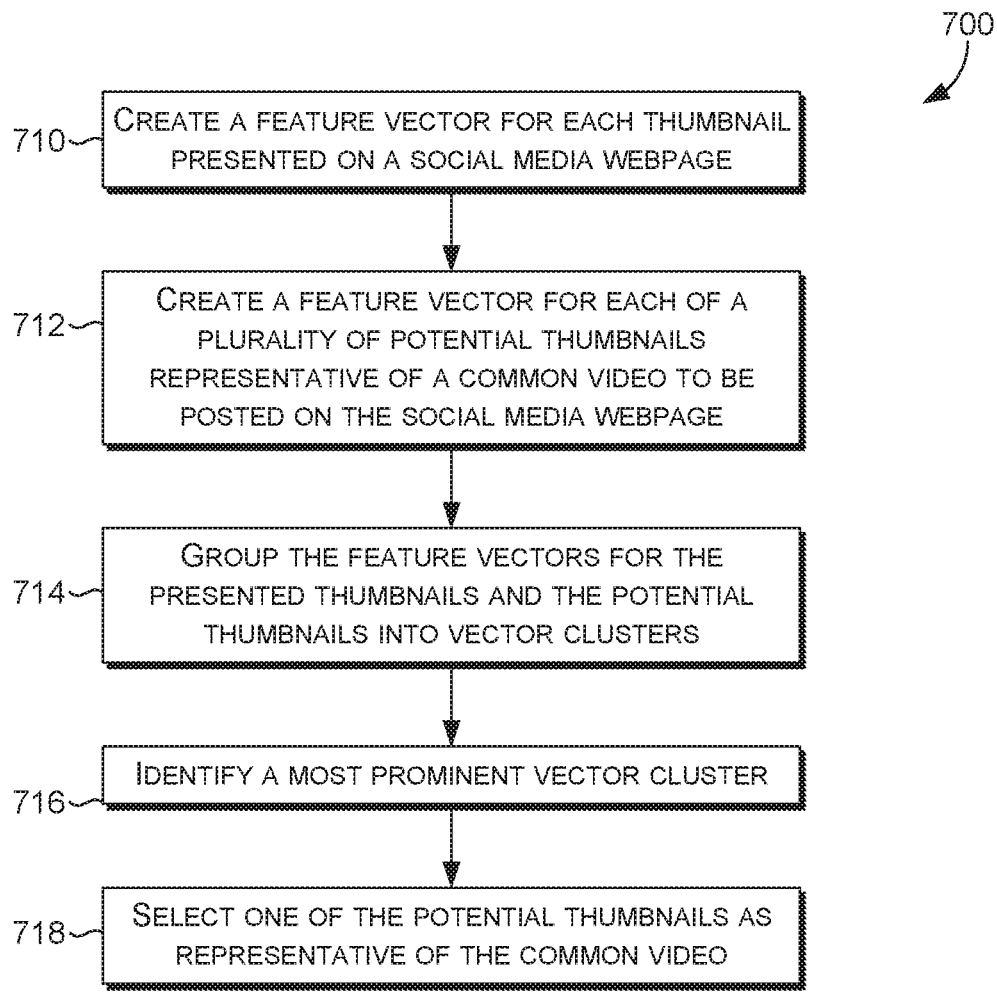
FIG. 7 is a flow diagram illustrating an exemplary method for selecting video thumbnails for presentation on social media webpages, each thumbnail being representative of a video to be posted on one or more of the social media webpages, in accordance with implementations of the present disclosure.

Turning now to FIG. 7, shown is a flow diagram illustrating an exemplary method 700 for selecting video thumbnails for presentation on social media webpages, each thumbnail being representative of a video to be posted on one or more of the social media webpages, in accordance with implementations of the present disclosure. As indicated at block 710, a feature vector is created for each of a plurality of thumbnails presented on a social media webpage (e.g., utilizing the feature vector creating component 122 of the thumbnail selection engine 112 of FIG. 1). Each thumbnail is representative of an associated video posted on the social media webpage and includes an image of an influencer. As indicated at block 712, a feature vector is created for each of a plurality of potential thumbnails (e.g., utilizing the feature vector creating component 122 of the thumbnail selection engine 112 of FIG. 1). Each potential thumbnail is representative of a common video to be posted on the social media webpage and includes an image of the influencer.

As indicated at block 714, the feature vectors for the presented thumbnails and the feature vectors for the potential thumbnails are grouped into a plurality of vector clusters (e.g., utilizing the feature vector grouping component 130 of the thumbnail selection engine 112 of FIG. 1). As indicated at block 716, a most prominent vector cluster of the plurality of vector clusters is identified (e.g., utilizing the prominent vector cluster identifying component 134 of the thumbnail selection engine 112 of FIG. 1). As indicated at block 418, a potential thumbnail is selected as representative of the common video (e.g., utilizing the potential thumbnail selecting component 128 of the thumbnail selection engine 112 of FIG. 1). The feature vector for the selected potential thumbnail has a distance from a centroid vector of the most prominent vector cluster that is less than a distance from the centroid vector of all other potential thumbnail feature vectors grouped in the most prominent vector cluster.

Figure 8:
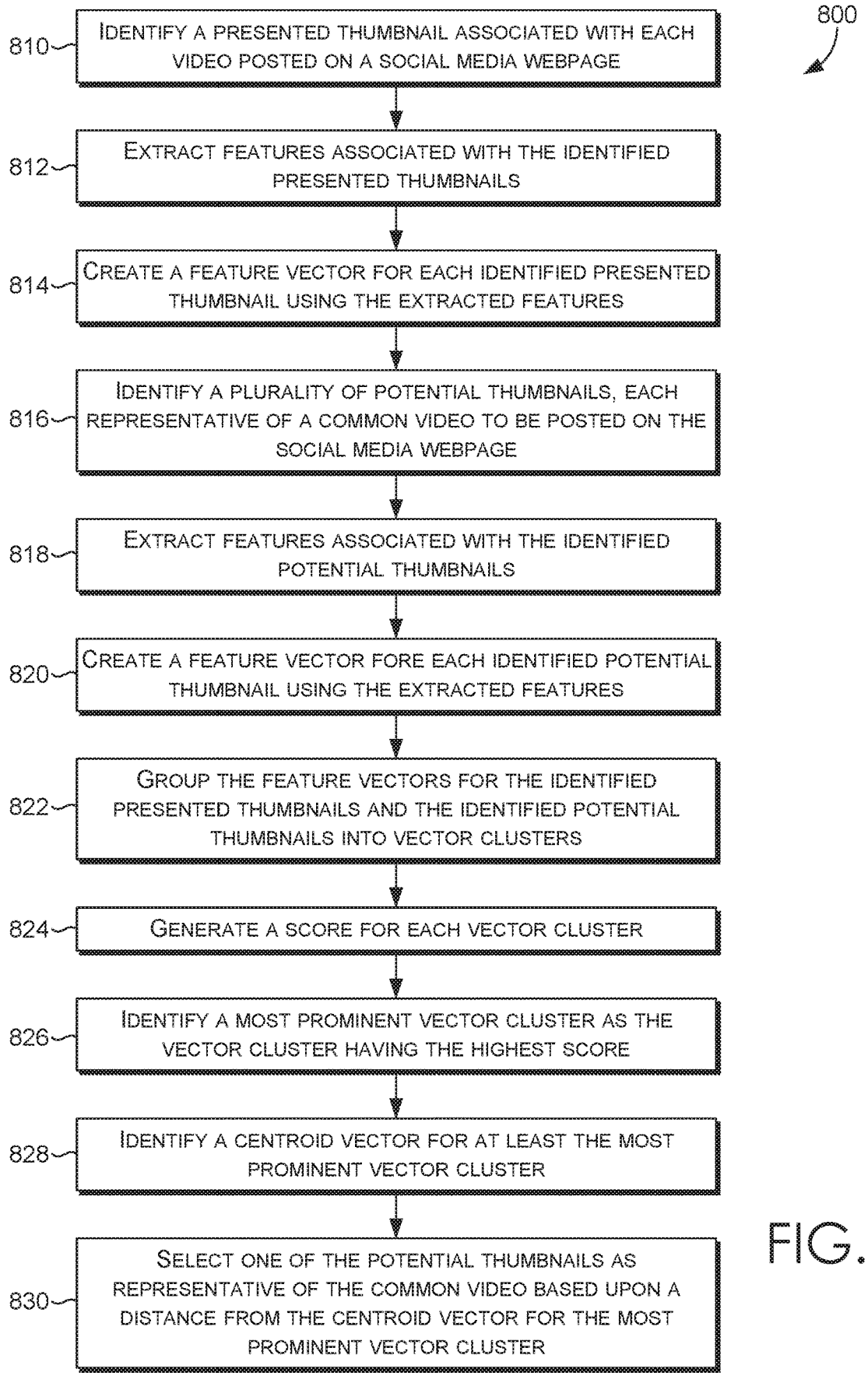
FIG. 8 is a flow diagram illustrating another exemplary method for selecting video thumbnails for presentation on social media webpages, each thumbnail being representative of a video to be posted on one or more social media webpages, in accordance with implementations of the present disclosure.

Embodiments of the present disclosure further relate to a computer system comprising one or more processors and one or more computer storage media storing computer-useable instructions that, when used by the one or more processors, cause the one or more processors to perform a method 800 for selecting video thumbnails to present on social media webpages. With reference to FIG. 8, and as indicated at block 810, a presented thumbnail associated with each of a plurality of videos posted on a social media webpage is identified (e.g., utilizing the presented thumbnail identifying component 118 of the thumbnail selection engine 112 of FIG. 1). Each presented thumbnail includes a picture/image of an influencer. As indicated at block 812, a first plurality of features is extracted from each of the plurality of presented thumbnails (e.g., utilizing the feature extracting component 120 of the thumbnail selection engine 112 of FIG. 1) and, as indicated at block 814, a feature vector is created for each identified presented thumbnail using the extracted first plurality of features (e.g., utilizing the feature vector creating component 122 of the thumbnail selection engine 112 of FIG. 1).

As indicated at block 816, a plurality of potential thumbnails is identified (e.g., utilizing the potential thumbnail identifying component 126 of the thumbnail selection engine 112 of FIG. 1), each potential thumbnail being representative of a common video to be posted on the social media webpage and including an image of the influencer. As indicated at block 818, a second plurality of features is extracted (e.g., utilizing the feature extracting component 120 of the thumbnail selection engine 112 of FIG. 1) from each of the plurality of identified potential thumbnails. As indicated at block 820, a feature vector for each identified potential thumbnail is created using the extracted second plurality of features (e.g., utilizing the feature vector creating component 122 of the thumbnail selection engine 112 of FIG. 1).

As indicated at block 822, the feature vectors for the identified presented thumbnails and the feature vectors for the identified potential thumbnails are grouped (e.g., utilizing the feature vector grouping component 130 of the thumbnail selection engine 112 of FIG. 1) into a plurality of vector clusters. As indicated at block 824, a score is generated (e.g., utilizing the score generating component 138 of the prominent vector cluster identifying component 134 of the thumbnail selection engine 112 of FIG. 1) for each vector cluster. As indicated at block 826, a most prominent vector cluster is identified as the cluster having the highest score (e.g., utilizing the prominent vector cluster identifying component 134 of the thumbnail selection engine 112 of FIG. 1).

As indicated at block 828, a centroid vector is identified for at least the most prominent vector cluster of the plurality of vector clusters (e.g., utilizing the centroid vector identifying component 132 of the thumbnail selection engine 112 of FIG. 1). As indicated at block 830, a potential thumbnail of the plurality of potential thumbnails is selected as representative of the common video (e.g., utilizing the potential thumbnail selecting component 128 of the thumbnail selection engine 112 of FIG. 1). The feature vector for the selected potential thumbnail has a distance from the centroid vector of the most prominent vector cluster that is less than a distance from the centroid vector of all other potential thumbnail feature vectors grouped in the most prominent vector cluster.

Additional embodiments of the present disclosure relate to a computing system for selecting a thumbnail for presentation on a social media webpage, the selected thumbnail being representative of a video to be posted on the webpage and including an image of an influencer of interest to users that interact with the webpage. The computing system comprises means for creating a feature vector for each of a plurality of thumbnails presented on a social media webpage, each thumbnail of the plurality being representative of an associated video posted on the social media webpage and including a picture of an influencer; means for creating a feature vector for each of a plurality of potential thumbnails, each potential thumbnail of the plurality being representative of a common video to be posted on the social media webpage and including an image of the influencer; means for grouping the feature vectors for the presented thumbnails and the feature vectors for the potential thumbnails into a plurality of vector clusters; means for determining a quantity of associated video views generated by each presented thumbnail associated with the feature vectors comprising each vector cluster; means for generating a score for each of the plurality of vector clusters by calculating an average of the determined quantities; means for identifying the vector cluster having the highest score as the most prominent vector cluster; means for identifying a centroid vector of the most prominent vector cluster; and means for selecting a potential thumbnail of the plurality of potential thumbnails as representative of the common video, the feature vector for the selected potential thumbnail having a distance from the centroid vector that is less than a distance from the centroid vector of all other potential thumbnail feature vectors grouped in the most prominent vector cluster.

Figure 9:
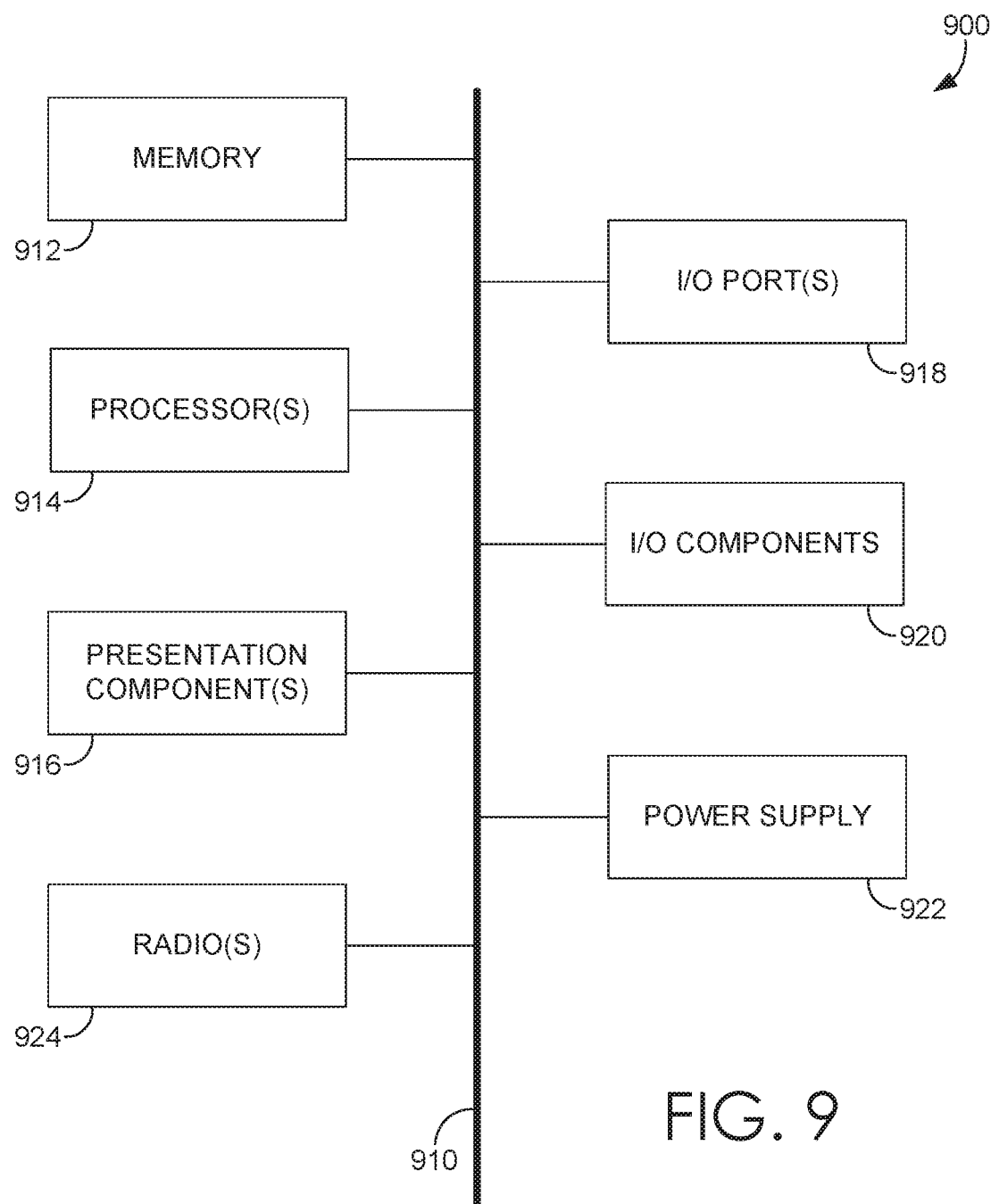
FIG. 9 is a block diagram of an exemplary computing environment suitable for use in implementations of the present disclosure.

Having described implementations of the present disclosure, an exemplary operating environment in which embodiments of the present disclosure may be implemented is described below in order to provide a general context for various aspects hereof. Referring to FIG. 9, an exemplary operating environment for implementing embodiments of the present disclosure is shown and designated generally as computing device 900. The computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments hereof may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present disclosure may be practiced in a variety of system configurations, including hand-held devices, consumer electronics, general-purpose computers, more specialty computing devices, etc. Embodiments of the present disclosure also may be practiced in distributed computing environments where tasks are performed by remote-processing devices that are linked through a communications network.

With continued reference to FIG. 9, the computing device 900 includes a bus 910 that directly or indirectly couples the following devices: a memory 912, one or more processors 914, one or more presentation components 916, input/output (I/O) ports 918, input/output components 920, and an illustrative power supply 922. The bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

The computing device 900 typically includes a variety of computer-readable media. Computer-readable media can be any available media that can be accessed by the computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 912 includes computer storage media in the form of volatile and/or nonvolatile memory. The memory may be removable, non-removable, or a combination thereof. Exemplary hardware devices include solid-state memory, hard drives, optical-disc drives, etc. The computing device 900 includes one or more processors that read data from various entities such as the memory 912 or the I/O components 920. The presentation component(s) 916 present data indications to a user or other device. Exemplary presentation components include a display device, speaker, printing component, vibrating component, etc.

The I/O ports 918 allow the computing device 900 to be logically coupled to other devices including the I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

As described above, implementations of the present disclosure relate to a framework for selecting video thumbnails to present on social media webpages. The present disclosure has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this disclosure is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage media storing computer-useable instructions that, when used by one or more computing devices, cause the one or more computing devices to perform operations comprising:
   analyzing content of a webpage on which a video is to be posted to determine a first plurality of individuals represented in the content of the first webpage;
   processing frames of the video using image recognition to identify a second plurality of individuals in the video;

selecting a first individual included in both the first plurality of individuals and the second plurality of individuals, the first individual selected using a score for the first individual determined based on a frequency at which the first individual is represented in the content of the webpage;

subsequent to selecting the first individual using the score for the first individual determined based on the content of the webpage, analyzing frames of the video that include the first individual to select a first frame of the video that includes the first individual;

generating, from the selected first frame, a thumbnail to represent the video on the webpage; and providing the thumbnail for presentation on the webpage.

2. The computer storage media of claim 1, wherein the score for the first individual is further based on a frequency at which the first individual is represented in the video.

3. The computer storage media of claim 1, wherein the score for the first individual is further based on user engagement with one or more portions of the content of the webpage regarding the first individual.

4. The computer storage media of claim 1, wherein analyzing the frames of the video that include the first individual to select the first frame of the video is based on: a first plurality of feature vectors for a plurality of images presented on the webpage, each feature vector from the first plurality of feature vectors corresponding with a respective image from the plurality of images, and a second plurality of feature vectors for a plurality of potential thumbnails from the video, each feature vector from the second plurality of feature vectors corresponding with a respective potential thumbnail.

5. The computer storage media of claim 4, wherein the plurality of images presented on the webpage for which the first plurality of features vectors are generated are selected based on one or more selected from the following: a quantity of images presented on the webpage, and a time period during which each image was presented on the webpage.

6. The computer storage media of claim 4, wherein analyzing the frames of the video that include the first individual to select the first frame of the video comprises:

grouping the first plurality of features vectors and the second plurality of feature vectors into a plurality of vector clusters;

selecting a first vector cluster of the plurality of vector clusters; and selecting a potential thumbnail of the plurality of potential thumbnails based on a distance of the feature vector for the selected potential thumbnail from a centroid vector of the first vector cluster.

7. The computer storage media of claim 6, wherein the first plurality of feature vectors and the second plurality of features vectors are grouped into the plurality of vector clusters using K-Means clustering.

8. The computer storage media of claim 6, further comprising identifying the centroid vector of the first vector cluster using K-Means clustering.

9. The computer storage media of claim 6, wherein selecting the first vector cluster of the plurality of vector clusters comprises:

generating a score for each vector cluster of the plurality of vector clusters; and selecting the first vector cluster based on the scores for the plurality of vector clusters.

10. The computer storage media of claim 9, wherein the score for each vector cluster of the plurality of vector clusters is generated based on a quantity of associated video views generated by each thumbnail associated with at least a portion of the feature vectors comprising each vector cluster.

11. A computer-implemented method, comprising selecting a first individual included in both a first plurality of individuals represented in content of a webpage and a second plurality of individuals identified in a video to be posted on the webpage, the first individual selected using a score for the first individual determined based on a frequency at which the first individual is represented in the content of the webpage;

responsive to selecting the first individual using the score for the first individual determined based on the content of the webpage, analyzing a plurality of frames of the video with the first individual to select a target frame;

generating a thumbnail from the selected target frame; and providing the thumbnail for presentation on the webpage to represent the video.

12. The computer-implemented method of claim 11, wherein the score for the first individual is further based on a frequency at which the first individual is represented in the video.

13. The computer-implemented method of claim 11, wherein the score for the first individual is further based on user engagement with one or more portions of the content of the webpage regarding the first individual.

14. The computer-implemented method of claim 11, wherein analyzing the plurality of frames of the video with the first individual to select the target frame is based on: a first plurality of feature vectors for a plurality of images presented on the webpage, each feature vector from the first plurality of feature vectors corresponding with a respective image from the plurality of images, and a second plurality of feature vectors for a plurality of potential thumbnails from the video, each feature vector from the second plurality of feature vectors corresponding with a respective potential thumbnail.

15. The computer-implemented method of claim 14, wherein analyzing the plurality of frames of the video with the first individual to select the target frame comprises:

grouping the first plurality of features vectors and the second plurality of feature vectors into a plurality of vector clusters;

selecting a first vector cluster of the plurality of vector clusters; and selecting a potential thumbnail of the plurality of potential thumbnails based on a distance of the feature vector for the selected potential thumbnail from a centroid vector of the first vector cluster.

16. The computer-implemented method of claim 15, wherein selecting the first vector cluster of the plurality of vector clusters comprises:

generating a score for each vector cluster of the plurality of vector clusters; and selecting the first vector cluster based on the scores for the plurality of vector clusters.

17. The computer-implement method of claim 16, wherein the score for each vector cluster of the plurality of vector clusters is generated based on a quantity of associated video views generated by each thumbnail associated with at least a portion of the feature vectors comprising each vector cluster.

18. A computing system comprising:
one or more processors; and
one or more computer storage media storing computer-useable instructions that, when used by the one or more processors, cause the one or more processors to:
determine a score for each individual from a plurality of individuals identified in frames of a video and in content associated with a webpage on which the video is to be posted, the score based at least in part on a frequency at which the individual is represented in the content associated with the webpage on which the video is to be posted;
select a first individual from the plurality of individuals based on the score determined for each individual;
subsequent to selecting the first individual based on the score determined for each individual, analyze frames of the video that include the first individual to select a target frame that includes the first individual;
generate, from the target frame, a thumbnail to represent the video on the webpage; and
provide the thumbnail for presentation on the webpage.

19. The computing system of claim 18, wherein the score for each individual is further based on a frequency at which the individual is represented in the video.

20. The computing system of claim 18, wherein analyzing the frames of the video that include the first individual to select the first frame of the video is based on: a first plurality of feature vectors for a plurality of images presented on the webpage, each feature vector from the first plurality of feature vectors corresponding with a respective image from the plurality of images, and a second plurality of feature vectors for a plurality of potential thumbnails from the video, each feature vector from the second plurality of feature vectors corresponding with a respective potential thumbnail.

* * * * *

UNITED STATES PATENT AND TRADEMARK OFFICE
CERTIFICATE OF CORRECTION

| | |
|---|---|
| PATENT NO. | : 11,762,900 B2 |
| APPLICATION NO. | : 17/668185 |
| DATED | : September 19, 2023 |
| INVENTOR(S) | : Sanjeev Tagra and Sachin Soni |

It is certified that error appears in the above-identified patent and that said Letters Patent is hereby corrected as shown below:

In the Claims

Claim 1, Column 14, Line 20: In the line reading "represented in the content of the first webpage;" should read --represented in the content of the webpage;--.

Signed and Sealed this
Seventh Day of November, 2023

*Katherine Kelly Vidal*

Katherine Kelly Vidal
*Director of the United States Patent and Trademark Office*